US010778648B2

(12) United States Patent
Norman et al.

(10) Patent No.: US 10,778,648 B2
(45) Date of Patent: Sep. 15, 2020

(54) SYSTEMS AND METHODS FOR REGIONAL DATA STORAGE AND DATA ANONYMIZATION

(71) Applicant: Nexmo Inc., San Francisco, CA (US)

(72) Inventors: Mark Norman, London (GB); Fabien Lescelliere-Dumilly, Toledo (ES); Eric Nadalin, London (GB)

(73) Assignee: Nexmo Inc., San Francisco, CA (US)

( * ) Notice: Subject to any disclaimer, the term of this patent is extended or adjusted under 35 U.S.C. 154(b) by 169 days.

(21) Appl. No.: 15/591,258

(22) Filed: May 10, 2017

(65) Prior Publication Data
US 2018/0332008 A1    Nov. 15, 2018

(51) Int. Cl.
*H04L 29/06* (2006.01)
*H04L 29/08* (2006.01)
*G06F 21/60* (2013.01)
*G06F 21/62* (2013.01)

(52) U.S. Cl.
CPC ........ *H04L 63/0421* (2013.01); *G06F 21/602* (2013.01); *G06F 21/6254* (2013.01); *H04L 67/141* (2013.01); *H04L 67/18* (2013.01); *H04L 63/08* (2013.01)

(58) Field of Classification Search
CPC ............ G06F 21/6245; G06F 21/6254; H04L 2209/42; H04L 63/0421; H04L 29/06639; H04L 29/06653
See application file for complete search history.

(56) References Cited

U.S. PATENT DOCUMENTS

| 8,832,234 | B1* | 9/2014 | Brooker ................ G06F 16/182 709/219 |
| 8,898,272 | B1* | 11/2014 | Young ................. H04L 63/0407 709/223 |
| 2008/0250447 | A1* | 10/2008 | Rowe ..................... G06Q 30/02 725/32 |
| 2011/0016145 | A1* | 1/2011 | De Lutiis .......... H04L 29/12066 707/769 |

(Continued)

OTHER PUBLICATIONS

W. McClay, "Mobile data and individual client diagnostic acquisition from pgws call analysis utilizing spark and the hadoop ecosystem", Northeastern Univ., IntroPro/DirecTV Corp., Journal of Remote Sensing & GIS, DOI: 10.4172/2469-4134.C1.002 (Year: 2016).*

*Primary Examiner* — Tri M Tran
(74) *Attorney, Agent, or Firm* — Moser Taboada; Joseph Pagnotta

(57) ABSTRACT

Systems and methods for data localization and anonymization are provided herein. In some embodiments, systems and methods for data localization and anonymization may include receiving a communication request to send a message or establish a call between a first service provider and an end user device associated with an end user, determining that the communication request is associated with a requirement for securing personally identifiable information (PII) of the end user, and processing the communication request based on the requirement for securing the PII of the end user, wherein the requirement includes at least one of (A) localization of the communication request processing or (B) anonymization of any data records associated with the communication request that includes the PII of end user.

20 Claims, 4 Drawing Sheets

(56) References Cited

U.S. PATENT DOCUMENTS

| | | | |
|---|---|---|---|
| 2011/0255688 A1* | 10/2011 | Spalink | G06F 21/6254 |
| | | | 380/29 |
| 2015/0100426 A1* | 4/2015 | Hartzell | H04W 4/21 |
| | | | 705/14.58 |
| 2015/0350890 A1* | 12/2015 | Arunkumar | H04W 12/02 |
| | | | 455/411 |
| 2016/0140580 A1 | 5/2016 | Calo et al. | |
| 2017/0054689 A1* | 2/2017 | Hughes | G06F 21/6245 |
| 2017/0359313 A1* | 12/2017 | Livneh | H04L 63/0414 |
| 2018/0241569 A1* | 8/2018 | Harmon | H04L 9/3247 |

\* cited by examiner

SYSTEMS AND METHODS FOR REGIONAL DATA STORAGE AND DATA ANONYMIZATION

BACKGROUND OF THE INVENTION

Field of the Invention

Embodiments of the present invention relate generally to systems and methods for regional data storage and data anonymization. More specifically, the present invention relates to systems and methods for anonymizing stored end user data and ensuring end user data is transmitted and stored on systems pinned to a designated geo-location (i.e., geo-pinning).

Description of the Related Art

End users of mobile applications and online services have to rely on and trust service providers with respect to the end user data they provide. The service providers, in turn, require that the end users provide a lot of personally identifying information (PII) in order to be able to serve the end users properly, and possibly for other reasons. However, the personally identifying information of end users can easily be misused, consciously or unconsciously, but still very little is done to protect the privacy rights of the end users.

Privacy concerns exist wherever personally identifiable information or other sensitive information is collected, stored, used, and finally destroyed or deleted, in digital form or otherwise. Recently, end users, individual countries, and regions (e.g., the EU), have demanded more be done to protect end user data and to contain/store/transmit the data out of the reach of countries/regions whose governmental agencies may access it. In addition, there is a strong demand from service providers who have compliance regulations (e.g., the EU General Data Protection Regulation (GDPR), Health Insurance Portability and Accountability Act (HIPAA) regulations, and the like) that they have to meet with respect to privacy of end user data and storage, transmission, and access of end user data that needs to be geo-located/pinned within specific region/country.

Accordingly, there exists a need in the art for anonymizing stored end user data and ensuring end user data is transmitted and stored on systems pinned to a designated geo-location (i.e., geo-pinning).

SUMMARY OF THE INVENTION

Systems and methods for data localization and anonymization are provided herein. In some embodiments, systems and methods for data localization and anonymization may include receiving a communication request to send a message or establish a call between a first service provider and an end user device associated with an end user, determining that the communication request is associated with a requirement for securing personally identifiable information (PII) of the end user, and processing the communication request based on the requirement for securing the PII of the end user, wherein the requirement includes at least one of (A) localization of the communication request processing or (B) anonymization of any data records associated with the communication request that includes the PII of end user.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
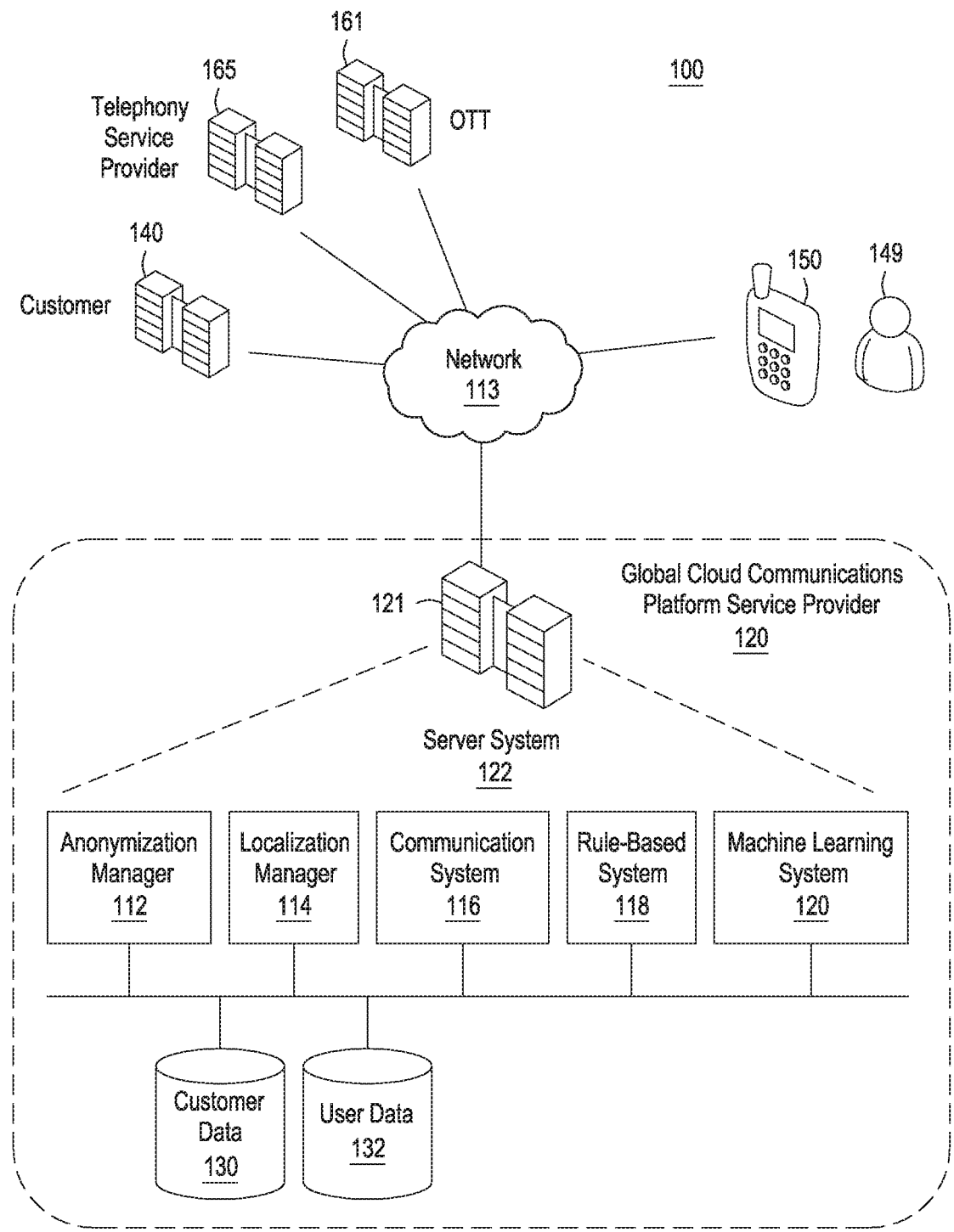
FIG. 1 is a diagram of a communication environment in accordance with one or more exemplary embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the present invention are directed to methods and systems for anonymizing stored end user data and ensuring end user data is transmitted and stored on systems pinned to a designated geo-location (i.e., geo-pinning). In some embodiments, end user data may be scrubbed/anonymized by removing the personally identifiable information (PII) from any records either immediately or after a certain time after (e.g., hours, weeks, months, at the time of archival/data warehouse storage, etc.). For example, in some embodiments, there may be a setting or flag on the API call to specify if, when and how to anonymize/store the data. In addition, in some embodiments there may also be a setting or flag on the API call regarding localization of the data to specify if, when and how to transmit and store with specific geo-location/geo-pinning constraints. As used herein, data localization is used to refer to the geolocation of the data (i.e., geo-pinning or regional data storage) as opposed to changing the language of the data and the like. In other embodiments, the API end point (i.e., the URL or address associated with the API end point) could be used to localize/contain data within a given region (e.g., an API call to api-us.nexmo.com will cause data to be contained within the US region while traffic directed to/from api.nexmo.com would be spread across multiple regions.) Various techniques associated with anonymizing stored end user data and/or ensuring end user data is transmitted and stored on systems pinned to a designated geo-location are described below.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any application that relies on or uses address books/contact directories may be used in embodiments consistent with the present invention without departing from the principles of the disclosure described herein. For example, access to the cloud address book may be provided via a browser of a user device. When a contact is modified in the cloud address book, the change is further reflected on the user device where the contact is a native contact, and further synchronized with the "owner" of the contact, such as GOOGLE, YAHOO!, or Exchange.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

FIG. 1 illustrates an example communications environment 100 for anonymizing stored end user data and ensuring end user data is transmitted and stored on systems pinned to a designated geo-location (i.e., geo-pinning). A global cloud communications platform service provider 120 implements functionality to facilitate communication with users using a variety of different types of communication channels, while anonymizing stored end user data and/or ensuring end user data is transmitted and stored on systems pinned to a designated geo-location. In particular, the global cloud communications platform service provider 120 manages communications between third parties such as a first service provider or business (e.g., customer 140) and users (e.g., user 149 using end user device 150) by means of telephony services and/or SMS services provided by a telephony service provider 165 (e.g., VOIP and/or PSTN telephony service providers), OTT 161 (Over the Top) messaging service provider, or other service provider, which are communicatively coupled via networks 113. The networks 113 comprise one or more communication systems that connect computers by wire, cable, fiber optic and/or wireless link facilitated by various types of well-known network elements, such as hubs, switches, routers, and the like. The networks 108 may include an Internet Protocol (IP) network, a public switched telephone network (PSTN), or other mobile communication networks, and may employ various well-known protocols to communicate information amongst the network resources.

The server system 122 comprises hardware and software components and databases that can be deployed at one or more data centers (DC) 121 in one or more geographic locations. The software components can comprise subcomponents that can execute on the same or on different individual data processing apparatus. The primary server system 122 includes a number of hardware and software modules to facilitate anonymization and geo-pinning (also referred to a localization) of end user data. In some embodiments, the server system 122 may be disposed at a single data center 121, or spread across multiple data centers 121. In some embodiments, the primary server system 122 may include an anonymization manager 112, a localization manager 114, a communication system 116, a rule-based system 118, and a machine learning system 120. The communication system 116 facilitates and manages the communications between customers 140 and end users devices 150. In some embodiments, communication system 116 performs authentication services that authenticates customers 140, users 149 or both with the server system 122 and, optionally, with a selected service providers 161 and 165. The anonymization manager 112 manages the anonymization of end user data. In some embodiments described herein, anonymization may include complete removal of PII or the encryption/obfuscation of PII. The localization manager 114 is responsible for geo-pinning the communication between customers and users and associated storage of end user data associated with those communications. An application programming interface (API) that is part of primary server system 122 and described in greater detail below can be used by customers' computer systems (e.g., customer 140) to communicate with the primary server system 122, and more specifically, with the anonymization manager 112 and/or a localization manager 114. The API can be provided to customers in a software library (e.g., in a software development kit or SDK). In some implementations, the API implements a communication protocol that supports message sending and authentication. In some embodiments, the API is provided as part of the communication system 116 on server system 122. The rule-based system 118 and the machine learning system 120, discussed further below, are systems that can be used by the anonymization manager 112 and/or a localization manager 114 to assist in determining whether and how to anonymize/localize end user data depending on a variety of factors. The server system 122 databases comprise, at least, a customer database 130 and an end user data database 132. The databases can reside in one or more physical storage systems. In some embodiments, the customer database 130 and/or the end user data database 132 may include customer profiles/settings and end user profiles/settings that specify if and how information is to be localized and/or anonymized.

End user devices 150 execute one or more applications that allow users 149 to obtain and send messages, and establish other types of communications such as voice and video calls. The end user device 150 can be a data processing apparatus such as a mobile phone, a smart watch, a tablet computer, a personal computer, a game console, or an in-car media system. Other examples of client devices are possible.

The customer 140 computer system sends a request for transmitting a message to the server system 122 using a communication protocol implemented by the aforementioned API. In some implementations, API requests are submitted by the customer 140 to the server system 122 using Hypertext Transfer Protocol (HTTP) where the parameters of the requests are in Extensible Markup Language (XML) or JavaScript Object Notation (JSON) format or using the WebSocket protocol. By way of illustration, a request to send a message to a user can include the following parameters: message content, optional authentication information, identification of the sender and the recipient of the message, and a message content type. Other parameters are possible. The message content type can indicate that the message is text or rich media (e.g., an image, video, audio, executable code, or programming language statements). If the message content type is rich media, the message can in some implementations include an address (e.g., a uniform resource locator address) from which the message can be obtained by the message recipient. That is, the request does not need to include the message content itself. In some embodiments, the sender, the recipient, or both can be specified in a Uniform Resource Identifier (URI) format.

The request may include information that specifies a user identifier of the recipient for the particular service. The user identifier can be a phone number of a user, a user account name (e.g., a text string) for the particular channel, or an identifier that can be mapped to an identifier for the channel. In some implementations, the sender is specified using a key or a Uniform Resource Locator (URL) address of the sender, for example. The server system 122 receives the request to send the message from the customer 140 and optionally authenticates the request.

Figure 2:
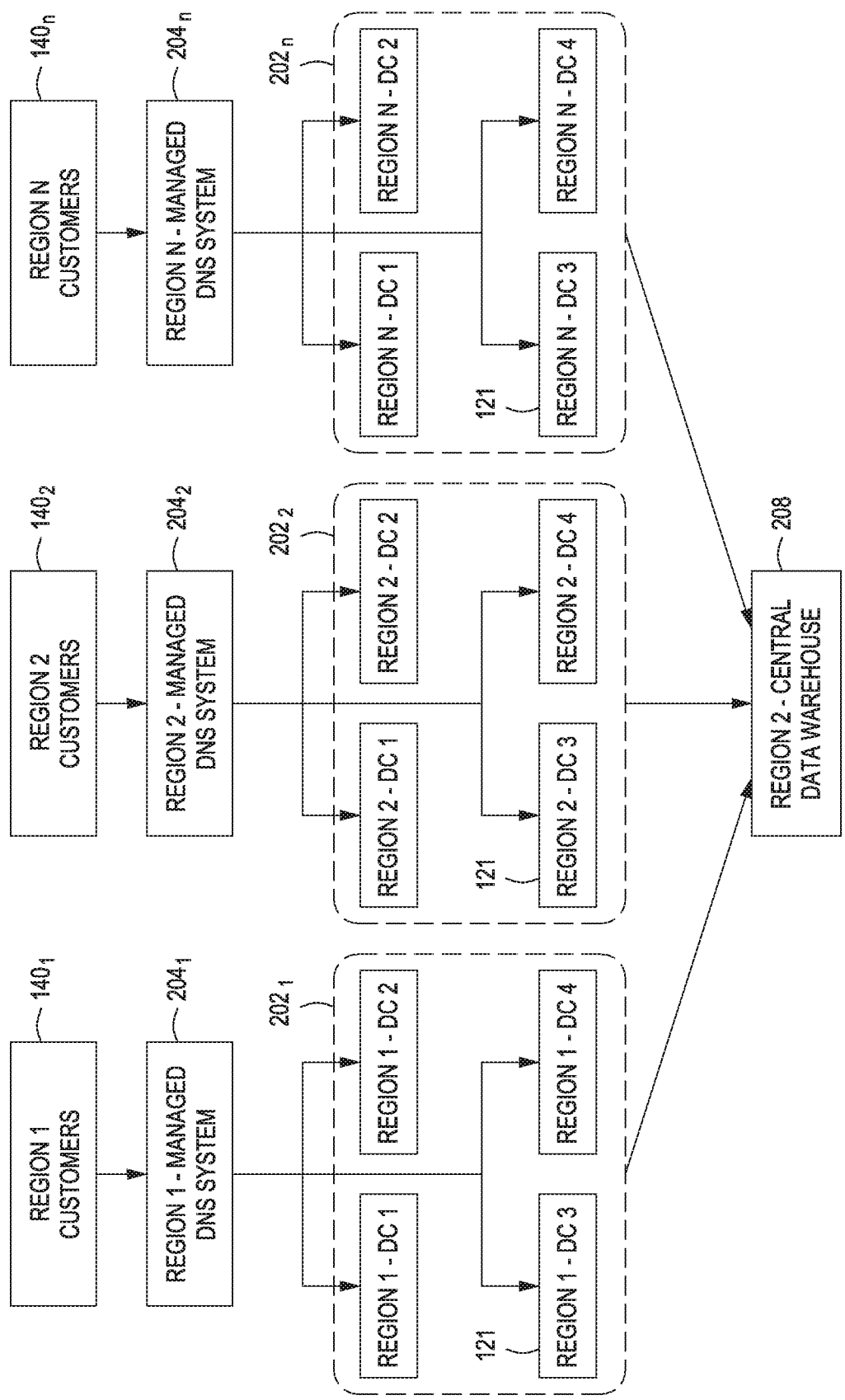
FIG. 2 is a detailed block diagram of a communication system for anonymizing stored end user data and/or ensuring end user data is transmitted and stored on systems pinned to a designated geo-location in accordance with one or more embodiments of the invention.

FIG. 2 depicts a block diagram of a plurality of data centers 121 described above grouped by region based on their location. In some embodiments, the grouping of data centers may be by physical geo-location (i.e., all data centers are located within a specific country, group of countries (e.g., the EU), state, etc.) In other embodiments, the grouping of data centers may be a logical grouping based policies/standards implemented by the data centers. Customers within a specific region that requires localization will access data centers within that same region. For example, customers $140_1$ within region 1 would be able access the services of region 1 data centers (e.g., data centers 121 in group $202_1$) that have been identified as being geo-located within region 1 $202_1$. Similarly, customers $140_2$ within region 2 would be able access the services of region 2 data centers (e.g., data centers 121 in group $202_2$) that have been identified as being geo-located within region 2. Requests and API calls to the various data centers may be routed via respective managed DNS systems $204_n$. In some embodiments, the managed DNS system 204 may be any DNS system that is able to manage DNS traffic (e.g., DYNECT).

For example, Customer 1 operates in Region 1 and wishes to communicate with End User 1. Customer 1 may make an API call to server system 122 to facilitate the communication. If regional data storage is required by any of Customer 1, End User 1 and/or by governmental/regulatory entities within Region 1, etc., then the systems associated with Customer 1 would make the API call to a server system 122 at a data center 121 that is geo-located within Region 1 (e.g., "DC2"). In that scenario, the message is initiated, transmitted and processed by servers within Region 1. In some embodiments, the API call is to a specific address (e.g., api-REGION1.server.com) that is directed to a managed DNS system $204_1$ that then directs the API call to one of the multiple data centers 121 geo-located within Region 1 (e.g., within $202_1$). In other embodiments, if Customer 1 makes an API call to a different end point that is not geo-located with Region 1, they may receive an error message noting that the call could not be processed due to localization rules. The error message may further include information as to what address to use or may re-direct the API call to the appropriate managed DNS system 204 or data center 121 based on a determination of the geo-location of at least one of Customer 1 or End User 1.

The above description pertains to the transmission of data within a specific region. When it comes to storage of data, some customers 140, end users 149, and/or by governmental/regulatory entities may also require that all data be stored within the same region, while other would only require data that includes PII be geo-pinned within a specific region. However, in some embodiments, anonymized data that removes the PII would meet the requirement for some customers and governmental/regulatory entities, which would allow anonymized data to be stored in a global data warehouse 208. For example, Customer 1 from Region 1 may have regional data storage requirements with respect to data transmission and non-anonymized data. However, Customer 1 may not have any requirements on where the data is stored once it has been anonymized to remove the PII. Thus, anonymized data from Customer 1 may be stored in global data warehouse 208 geo-located in Region 2. Region 2, however, may require that all data generated by customers within Region 2 be stored locally, whether anonymized or not.

In some embodiments, the data may be anonymized immediately, or after a certain time period (e.g., after 1 month, 1 week, 1 day, etc.). The data would be stored locally until such time it is anonymized and can also be stored in the global data warehouse 208. In some embodiments, anonymization of the data may be set as a preference on the customer's 140 account. In other embodiments, anonymization may be set as a flag on the initial API call.

Exemplary use cases for the anonymization and localization of data are provided below. In a first example, a national government health agency may have many IT providers who must comply with national or regional (e.g., EU) data protection laws. The agency and/or IT providers may be customers 140 of the global cloud communications platform service provider 120, and use the services of the global cloud communications platform service provider 120 to send text messages or provide automated voice communications to patients or employees.

The national government health agency may impose various anonymization/regional data storage requirements on their IT providers and the global cloud communications platform service provider 120. In this example, those requirements may include the following: (A) Any PII data which transits outside the EU, whether temporarily or for storage, triggers a review of all systems used; (B) if PII data is stored within the EU, no review is required; (C) any PII data should be encrypted; and (D) implementation of a data retention policy that removes non-anonymized data after one month.

In embodiments consistent with the present invention, the above requirements are met by the global cloud communications platform service provider 120 by performing the following:

Set customer account preference to anonymize data after one month
   Set customer account preference to only use EU datacenters Only accept the customer's API requests at an EU API endpoint, and reject any customer API requests at other API endpoints that are not located in the EU Store customer non-anonymized data only in an EU datacenter Automatically delete customer's non-anonymized data after one month Store an anonymized version of the data in a global central data warehouse 208 for billing, reporting and analytics use In a second example, a global bank customer 140 wishes to send messages to end user devices 150 of end users 149 located in different countries. To ensure compliance with regional data protection laws, the global bank customer 140 does not want any messages to be saved. Thus, the global bank customer 140 requires that end user data is deleted as soon as a message has been processed successfully.

In embodiments consistent with the present invention, the above requirements of the global bank customer 140 are met by the global cloud communications platform service provider 120 by (A) not storing any data records containing non-anonymized data, and (B) storing only an anonymized version of the data in a global central data warehouse 208 for reporting and analytics use.

In a third example, a U.S. based global social network customer 140 wishes to ensure their user data stays within the U.S., for privacy and/or security reasons. The global social network customer 140 requires that no end user PII data transits outside of the U.S. and the no end user PII data is stored outside of the U.S.

In embodiments consistent with the present invention, the above requirements of the global bank customer 140 are met by the global cloud communications platform service provider 120 by performing the following:

Set customer account preference to only use US datacenters

Only accept the customer's API requests at an US API endpoint, and reject any customer API requests at other API endpoints that are not located in the US Store customer non-anonymized data only in an US datacenter Automatically delete customer's non-anonymized data after one month Store an anonymized version of the data in a global central data warehouse 208 for reporting and analytics use.

Figure 3:
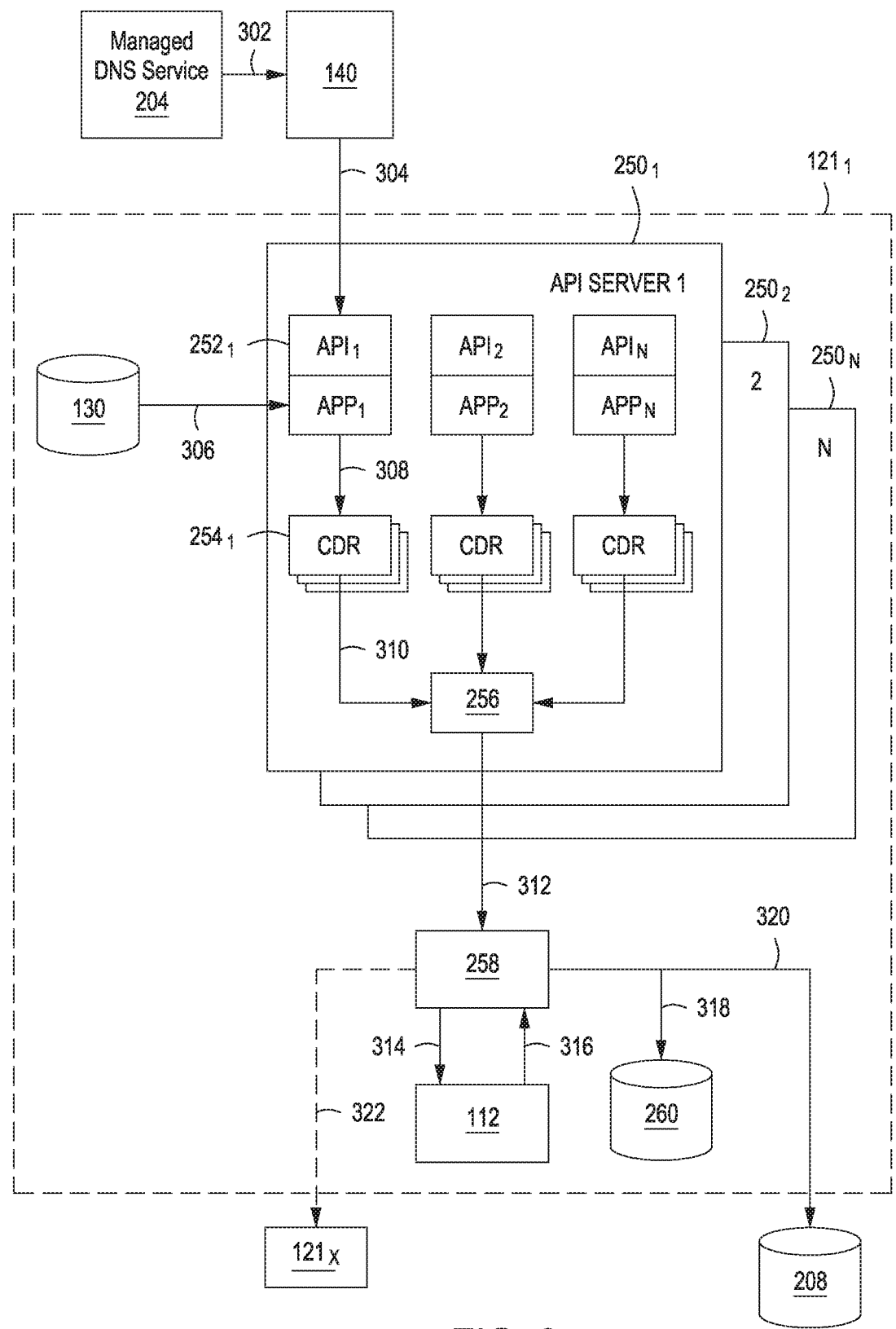
FIG. 3 is a block/system diagram of a regional data center depicting exemplary methods for anonymizing stored end user data and/or ensuring end user data is transmitted and stored on systems pinned to a designated geo-location in accordance with one or more embodiments of the invention.

Exemplary methods that may be performed by one or more elements of the server system 122 of global cloud communications platform service provider 120 for anonymizing stored end user data and ensuring end user data is transmitted and stored on systems pinned to a designated geo-location are described below with respect to flowchart 300 of FIG. 3. FIG. 3 depicts further details with respect to a regional data center 121 and the systems/services provided by the regional data center 121.

In FIG. 3, the method starts at 302 when the customer 140 receives the address of the appropriate regional data center 121 to use via the managed DNS service 204. At 304, the customer 140 sends a communication request to a system server 122 in the regional data center 121₁ based on the address received from the managed DNS service 204. More specifically, the request is sent to the appropriate application 252 on an application server 250 within data center 121₁ which is part of system server 122 described with respect to FIG. 1, based on the identity of the customer 140 and their associated settings/rule, and the address specified in the request. The communication request may be a request to establish a call, or other form of communication, between the customer 140 and the end user 149. In some embodiments, the communication request may be a request to establish a call, or other form of communication, between multiple end users 149.

In some embodiments, the request may include PII data about the end user and flags that trigger performance of localization and anonymization methods and systems. The PII data may include some or all of the following information: the end user's name, phone number, OTT chat username, previous names used, physical or mailing addresses (residence or otherwise), date of birth, details of relatives, personal health details, personal employment details, personal relationship details, personal financial details, personal contact details such as email address, or anything else that could be transmitted in a message or call. In other embodiments, the call request may only include an account number and/or phone number which is then used to retrieve the PII of the end user required to process the request. In some embodiments, the PII may be provided in a separate chat session, text message, or call with the customer 140 or end user 150. In some embodiments, if the PII is provided in a call, a recording of the call may be saved and the PII may be extracted from the recording. In some embodiments, the system server 122 may reject the request if localization rules are in effect for that customer 140, and the request came from outside an approved region. The request may be a call request or a request to transmit a message between customer 140 and end-user device 150. The request may be in the form of an API call transmitted using HTTP or WebSocket protocol.

In some embodiments, each application 252 may include a localization manager 114 described above with respect to FIG. 1. In other embodiments, each application server 250 may include a common localization manager 114 that may be used by all applications 252. When the request is received, the application 252 and the associated API processes the API call and retrieves customer localization and anonymization rules from customer database 130 for customer 140 at 306. In some embodiments, the API call may include a flag and/or additional information that specifies the following: whether at least some of the data in the request should be anonymized, the time period after which the data should be anonymized (e.g., immediately or after 30 days, etc.), localization rules with respect to transmission and/or storage of the data, and the like. The subsequent transmittal and storage of data will be based on the localization and anonymization rules retrieved from the customer database 130 and the localization and anonymization flags included in the request. In some embodiments, the a parameter in the API call may be one of a flag specifying the localization requirement or an explicit choice of a geographic region the communication request should be processed in. For example, the explicit choice of a geographic region may be "EU" or "APAC". Similarly, in some embodiments, the a parameter in the API call may be one of a flag specifying the anonymization requirement or an explicit choice of governmental agency requirement that the end user data should be anonymized according to. For example, the explicit choice of a governmental agency requirement may be "HIPAA" or the like.

At 308, the application 252 will generate call data records (CDRs) 254$_n$ and/or other log files. In some embodiments, the CDRs will be in JSON format or XML format. At 310, a logging service 256 may continuously scan for new content such as the generated CDRs or log files. Any detected content is then pushed to streaming data processing platform 258 at 312. In some embodiments, the logging service 256 may be a FILEBEAT lightweight logging shipper or the like. In some embodiments, the streaming data processing platform 258 may an APACHE KAFKA cluster.

At 314, the streaming data processing platform 258 will send the CDRs to be anonymized by the anonymization manager 112. In some embodiments, the anonymization manager 112 may be implemented using a JAVA based processing engine or the APACHE SPARK data processing engine. In some embodiments, anonymization of the data may include removal of all PII data. In other embodiments, anonymization of the data may include encryption and/or obfuscation of all data. In some embodiments, all PII of the end user is encrypted prior to storage regardless of whether anonymization and/or localization is performed. In other embodiments, the data storage itself is encrypted.

At 316, the anonymized data is sent back to the streaming data processing platform 258. The anonymized data may then be sent at 320 to non-local storage such as a global central data warehouse 208. In some embodiments, the either anonymized or non-anonymized data may be sent and stored locally at 318 in database 260. In some embodiments, at 322, the streaming data processing platform 258 may also send mirror data to another data center 121x for backup/mirroring while adhering to the anonymization and localization for customer 140.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as JAVA, SMALLTALK or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 4:
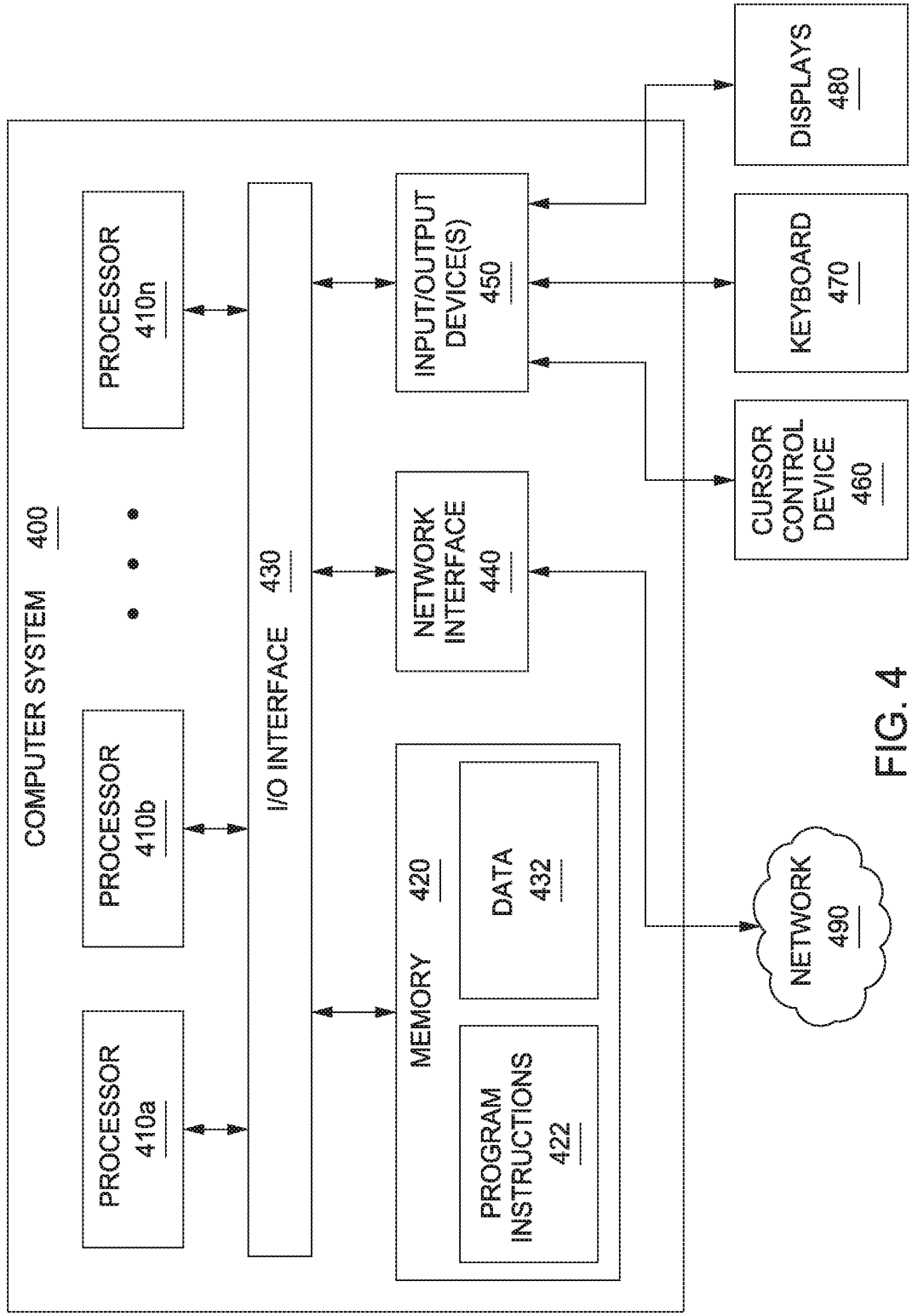
FIG. 4 is a depiction of a computer system that can be utilized in various embodiments of the present invention.

FIG. 4 depicts a computer system 400 that can be utilized in various embodiments of the present invention to implement the computer and/or the display, according to one or more embodiments.

Various embodiments of method and apparatus for localizing and anonymizing data, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the flowchart 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for securing end user information, comprising:
receiving a communication request to send a message or establish a call between a first telephony service provider and an end user device associated with an end user, or between two or more end user devices;
in response to receiving the communication request, determining that the communication request is associated with a requirement for securing personally identifiable information (PII) of the end user, wherein the PII is stored in one of a plurality of data centers, wherein the plurality of data centers is grouped by region based on their locations, and wherein the grouping of the data centers is one of physical geo-location or a logical grouping based on policies implemented by the data centers; and
processing the communication request based on the requirement for securing the PII of the end user, wherein the requirement includes at least one of (A) localization of the communication request processing allowing the end user to access data centers only within their region or (B) anonymization of any data records associated with the communication request that includes the PII of end user, wherein an anonymization requirement determines how and where PII is transmitted and stored.

2. The method of claim 1, wherein the communication request is processed based on a localization requirement, and wherein localization includes processing and transmitting the communication request on one or more servers chosen based on geographic location.

3. The method of claim 2, wherein the one or more servers are all geo-located within a same geographic region.

4. The method of claim 3, wherein the localization requirement further restricts storage of the PII of the end user to the same geographic region as the one or more servers.

5. The method of claim 2, wherein the communication request is an Application Programming Interface (API) call and the localization requirement for securing the PII of the end user is provided as a parameter in the API call.

6. The method of claim 5, wherein the parameter in the API call is one of a flag specifying the localization requirement or an explicit choice of a geographic region the communication request should be processed in.

7. The method of claim 2, wherein the determination that the communication request is associated with a localization requirement is based on information stored in association with the first telephony service provider.

8. The method of claim 1, wherein the communication request is processed based on an anonymization requirement, and wherein anonymization includes removal of the PII of the end user associated with the communication request.

9. The method of claim 8, wherein the PII of the end user includes at least one of a first or last name of the end user, a phone number, an email address, a workplace name, or a home address, or a workplace address.

10. The method of claim 8, wherein removal of the PII of the end user associated with the communication request is performed after a predetermined time period.

11. The method of claim 8, wherein removal of the PII of the end user associated with the communication request is performed directly after the processing of the communication request.

12. The method of claim 8, wherein the communication request is an Application Programming Interface (API) call and the anonymization requirement for securing the PII of the end user is provided as a parameter in the API call.

13. The method of claim 12, wherein the parameter in the API call is one of a flag specifying the anonymization requirement or an explicit choice of governmental agency requirement.

14. The method of claim 8, wherein the determination that the communication request is associated with an anonymization requirement is based on information stored in association with the first telephony service provider.

15. The method of claim 8, wherein the anonymized data records associated with the communication request are stored in a global central data warehouse that is not located in the same geographic region as the servers that process the communication request.

16. The method of claim 1, wherein the communication request is processed based on both a localization requirement and an anonymization requirement, wherein localization includes processing and transmitting the communication request on one or more servers chosen based on geographic location, and wherein anonymization includes removal of the PII of the end user associated with the communication request.

17. The method of claim 16, wherein the localization requirement only restricts storage of data records including non-anonymized PII of the end user to the same geographic region as the one or more servers that process and transmit the communication request.

18. The method of claim 1, wherein all PII of the end user is encrypted prior to storage.

19. A regional data center for securing end user information, comprising:
at least one application server comprising:
a) at least one processor;
b) at least one input device; and
c) at least one storage device storing processor executable instructions of a plurality of applications wherein each of application includes an application program interface and which, when executed by the at least one processor, perform a method to:
receive communications requests to send a message or establish a call between a first telephony service provider and an end user device associated with an end user, or between two or more end user devices, in response to receiving the communication request, geo-pin data and communications associated with the communication requests and the message or call when the communication requests meet localization requirements of the at least one application server and denying the communication requests when the localization requirements are not met, wherein each application is configured to generate call data records (CDRs) or log files associated with the message or call; and receive CDRs or log files generated and anonymize any personally identifying information (PII) included in the CDRs or log files.

20. The regional data center of claim 19, wherein the performed method further includes processing and transmitting the communication request on one or more servers chosen based on geographic location, and wherein the PII of the end user associated with the communication request is removed.

\* \* \* \* \*